United States Patent
Suyama et al.

(10) Patent No.: US 8,422,094 B2
(45) Date of Patent: Apr. 16, 2013

(54) ILLUMINATION DEVICE

(75) Inventors: Kouhei Suyama, Fukuoka (JP); Junichi Suematsu, Fukuoka (JP); Yuuzou Kawano, Fukuoka (JP)

(73) Assignee: Panasonic Corporation, Osaka (JP)

( * ) Notice: Subject to any disclaimer, the term of this patent is extended or adjusted under 35 U.S.C. 154(b) by 532 days.

(21) Appl. No.: 12/729,337

(22) Filed: Mar. 23, 2010

(65) Prior Publication Data

US 2010/0245943 A1    Sep. 30, 2010

(30) Foreign Application Priority Data

Mar. 31, 2009   (JP) ................................ P2009-084600

(51) Int. Cl.
*H04N 1/04*    (2006.01)

(52) U.S. Cl.
USPC ............ 358/475; 358/509; 358/474; 362/331

(58) Field of Classification Search .................. 358/474, 358/475, 509, 497, 486; 362/331, 97, 617
See application file for complete search history.

(56) References Cited

U.S. PATENT DOCUMENTS

| | | | | |
|---|---|---|---|---|
| 5,787,618 A | * | 8/1998 | Mullis | 40/219 |
| 7,513,674 B1 | * | 4/2009 | Donahue | 362/627 |
| 7,732,809 B2 | * | 6/2010 | Adachi et al. | 257/40 |
| 7,920,304 B2 | * | 4/2011 | Tatsuno et al. | 358/475 |
| 8,064,799 B2 | * | 11/2011 | Tanaka et al. | 399/128 |
| 8,345,327 B2 | * | 1/2013 | Mikami | 358/475 |
| 2002/0114152 A1 | * | 8/2002 | Fujino et al. | 362/31 |
| 2006/0269213 A1 | * | 11/2006 | Hwang et al. | 385/146 |
| 2008/0123368 A1 | * | 5/2008 | Fujino et al. | 362/628 |
| 2008/0285305 A1 | * | 11/2008 | Fujino et al. | 362/612 |

FOREIGN PATENT DOCUMENTS

JP    2008-140726    6/2008

* cited by examiner

*Primary Examiner* — Negussie Worku
(74) *Attorney, Agent, or Firm* — Greenblum & Bernstein, P.L.C.

(57) ABSTRACT

An illumination device comprising: an optical guide for receiving light emitted from a light source and guiding the light by repetitive transmission and reflection; a reflective member for reflecting light transmitting in the optical guide to an outside of the optical guide within the optical guide; a supplemental reflective member for reflecting light transmitting the reflective member and light leaked from the optical guide while evading the optical guide to an inside of the optical guide, transmitting the reflective member and light leak.

14 Claims, 11 Drawing Sheets

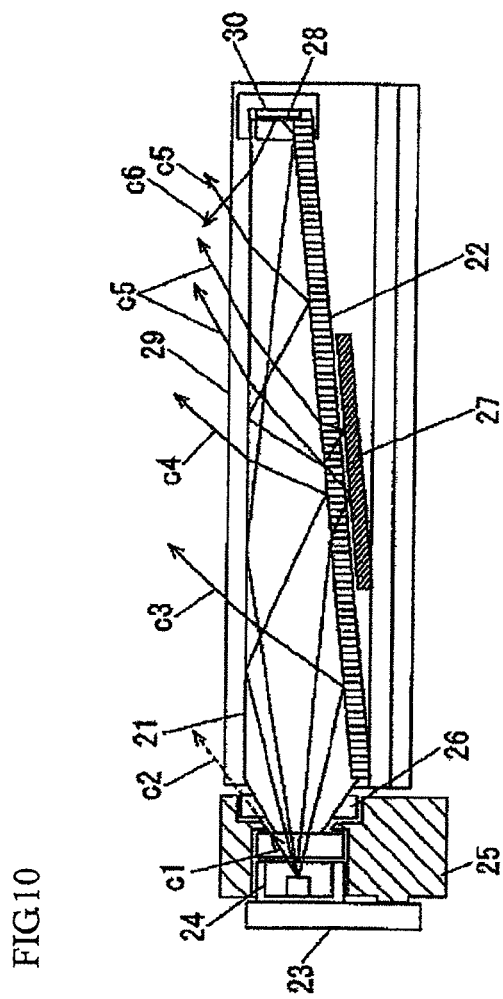

ILLUMINATION DEVICE

CROSS REFERENCE TO RELATED APPLICATIONS

The present application claims priority from Japanese Patent Application No. JP-2009-084600 filed on Mar. 31, 2009 and the subject matter of which is incorporated herein by reference.

TECHNICAL FIELD

The present invention relates to an illumination device that scans a draft by irradiating the draft with light and senses resultant reflected light by means of an optical sensor.

DESCRIPTION OF THE RELATED ART

In an image reading apparatus, a surface of a draft is illuminated with light by means of; for instance, a scanner. A photoelectric conversion element, such as a CCD and a CIS, receives resultant reflected light by way of a plurality of reduction optical systems or a fiber lens array capable of producing an equi-size upright image. A hitherto-known illumination system for a light source of an illumination device employed in the image reading apparatus is to illuminate a draft by means of a plurality of LEDs, a cold cathode fluorescent lamp (CCFL), or a xenon lamp.

When an illumination device, such as that mentioned above, reads the surface of a large A0-size draft, the image reading apparatus moves over the draft while illuminating the draft by means of the light source of the illumination device, thereby reading an image on the draft. To this end, some light sources use an optical guide having a plurality of light reflectance/reflection surfaces made in a transparent resin so as to illuminate an entire breadthwise area of the draft with light from LED light sources disposed outside the breadth of an image to be read.

For instance, (JP-A-2008-140726) describes an optical guide having LEDs serving as light sources that are mounted at respective end faces of the optical guide. Light led to inside of the optical guide propagates throughout a read area while undergoing total reflection within the optical guide. Minute rugged light refraction/reflection surfaces are made on one longitudinal side face of the optical guide in a direction orthogonal to the direction of a light exit.

In the illumination device having such a structure, light originated from the light source is led to inside of the optical guide, undergoes reflection on the minute rugged light refraction/reflection surfaces, and finally exits toward the draft. The light is expected to be uniform over the breadth of the document surface and in large quantity. Light is additionally expected to exhibit uniform luminous intensity despite fluctuations in a distance between the draft surface and the light source.

However, the related-art illumination device has been insufficient in terms of consistency in both light quantity and luminous intensity achieved in an axial direction.

SUMMARY

The exemplary embodiment of the present invention provides a technique for letting a light source making up an illumination device generate a uniform quantity of light over a breadth read range, as well as providing an illumination device that holds down fluctuations in illuminance stemming from variations in focal depth with respect to a surface of a draft.

An exemplary embodiment of the present invention provides an illumination device as illumination means of a scanner for illuminating a draft. The illumination device comprising: an optical guide for receiving light emitted from a light source and guiding the light by repetitive transmission and reflection; a reflective member for reflecting light transmitting in the optical guide to an outside of the optical guide within the optical guide; a supplemental reflective member for reflecting light leaked from the optical guide to an inside of the optical guide.

The configuration makes it possible to reflect the light leaked outside the light refraction/reflection surfaces of the optical guide toward the draft by means of a reflection member, to thus increase the quantity of outgoing light from the optical guide. Further, the reflection member is built in an area beneath the light refraction/reflection surfaces where small illuminance is achieved on a draft. Therefore, it is possible to make illuminance on a draft achieved over the entire breadth of an image uniform and further possible to make the density of a read image uniform.

Another exemplary embodiment of the present invention also provides an illumination device in which the light source element is disposed at each of both end faces of the plurality of coupled optical guides in their longitudinal directions and in which the reflection members are arranged in a symmetrical layout along the longitudinal direction of the optical guides and in correspondence with the plurality of respective optical guides.

When a draft having a large breadth is illuminated, the configuration makes it possible to make illuminance achieved on a draft uniform and symmetrical with respect to the breadth of the draft.

Another exemplary embodiment of the present invention also provides an illumination device in which the reflection member is provided in numbers along the axial direction of the optical guide and symmetrically with respect to the light refraction/reflection surfaces.

The configuration makes changes in illuminance achieved on a draft small even when a distance between the draft surface and the illumination device has changed and makes it possible to render illuminance achieved on a draft area uniform.

Another exemplary embodiment of the present invention provides an illumination device in which the reflection member has a cross-sectional area that is not uniform in the longitudinal direction of the optical guide.

The configuration makes it possible to lessen sharp variations in illuminance achieved at an end of the reflection member attributable to presence or absence of the reflection member, thereby rendering illuminance achieved on a draft surface uniform.

Another exemplary embodiment of the present invention provides an illumination device in which the reflection member is disposed in close proximity to the light refraction/reflection surface of the optical guide and also held by the optical guide.

The configuration makes it possible to efficiently illuminate the draft surface with the light exited to a reflection member side.

Another exemplary embodiment of the present invention provides an illumination device in which the reflection member is provided in numbers of rows in correspondence with the plurality of rows of light refraction/reflection surfaces of the optical guide.

The configuration makes it possible to efficiently illuminate a draft surface with the light exited to the reflection member side as well as to make illuminance achieved on a draft surface uniform.

Another exemplary embodiment of the present invention provides an illumination device in which a ring-shaped light shielding member is inserted to a light source element side of the optical guide.

The configuration makes it possible to block light exiting toward the draft, among light entering the optical guide from the light source element, immediately after entry into the optical guide, thereby lessening sharp variations in illuminance arising in the vicinity of a light entrance and making illuminance achieved on a draft surface uniform.

Another exemplary embodiment of the present invention provides an illumination device in which the light source element is an LED.

The configuration makes it possible to miniaturize a scanner.

Another exemplary embodiment of the present invention provides an illumination device that is illumination means of a scanner for illuminating a draft. A light source for illuminating the draft produces a main beam that exits in a direction orthogonal to a light refraction/reflection surface of an optical guide for guiding the light from a light source element in a breadthwise of the daft and a sub-beam that is reflected toward the document by a reflection member disposed parallel to the optical guide.

The configuration makes it possible to increase illuminance achieved on a draft surface and further lessen variations in light quantity even when variations arise in the position of the draft surface.

Another exemplary embodiment of the present invention provides an illumination device in which a focal point of the sub-beam is displaced from the position of a focal point of the main beam.

The configuration makes it possible to increase illuminance achieved on a draft surface and further lessen variations in light quantity even when variations arise in the position of the draft surface.

Another exemplary embodiment of the present invention provides an illumination device in which the reflection members are disposed symmetrically with respect to the light refraction/reflection surface of the optical guide.

The configuration makes it possible to easily increase illuminance on the draft surface.

Another exemplary embodiment of the present invention provides an illumination device in which the reflection member is provided in numbers in an axial direction of the optical guide.

The configuration makes it possible to increase illuminance achieved on a draft surface and make illuminance achieved on a draft surface more uniform.

The illumination device using the light source of the exemplary embodiments of the present invention makes it possible to increase illuminance achieved on the draft surface and make illuminance achieved on the draft surface uniform.

Exemplary embodiments of the present invention make it possible to illuminate a draft surface with direct light originating from a light source element by way of an optical guide and with reflected light, wherein the reflected light is generated by reflecting light, which has exited outside the optical guide, toward the draft surface by means of a reflection member disposed in a lower part of a light refraction/reflection surface formed on the optical guide. Further, the exemplary embodiments of the present invention make it possible to form the reflection member at a local area, where illuminance is low, on the optical guide along its breadthwise direction or a location where illuminance is desired to be arbitrarily increased. Accordingly, it is possible to realize an illumination device that increases illuminance on a draft surface, thereby exhibiting an illuminance distribution having partial inconsistency in intensity within the breadth of the draft or an illuminance distribution that is uniform over the breadth of the draft. Thus, a scanner exhibiting high reading accuracy can be provided.

BRIEF DESCRIPTION OF THE DRAWINGS

FIG. 10 is a diagram showing the operating principle and the characteristics of the illumination device of the embodiment;

DETAILED DESCRIPTION OF EXEMPLARY EMBODIMENTS

An embodiment of the present invention is hereinbelow described by reference to the drawings.

A brief overview of an illumination device is first described by reference to FIGS. 1A to 1E.

The First Exemplary Embodiment

A first exemplary embodiment of the illumination device of the present invention is hereunder described.

Figure 1:
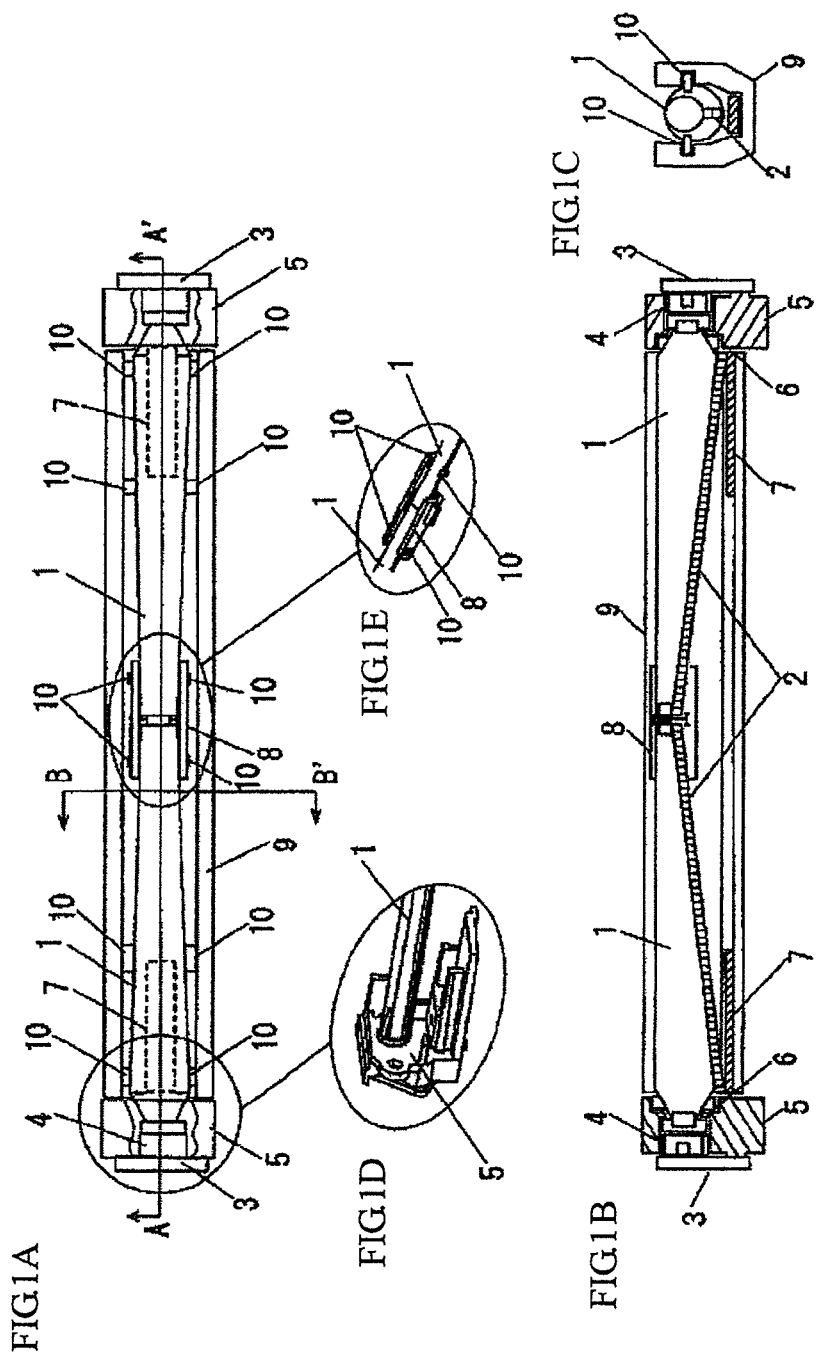
FIGS. 1A to 1E are schematic views of an illumination device of an embodiment.
Figure 2:
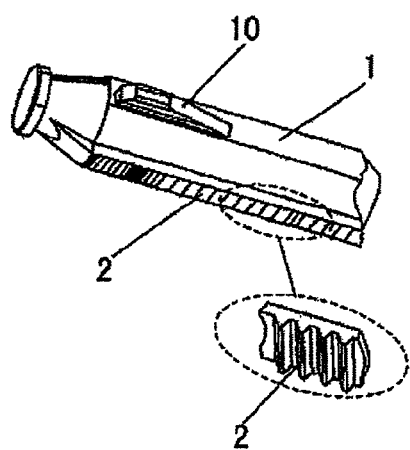
FIG. 2 is a detailed view of an optical guide employed in the illumination device of the embodiment.

FIGS. 1A to 1E are schematic views of the illumination device of the embodiment of the present invention. FIG. 1A is a plan view of the illumination device; FIG. 1B is a side cross-sectional view of the same taken along line A-A'; FIG. 1C is a front cross-sectional view of the same taken along line B-B'; FIG. 1D is a detailed view of a connecting portion of the illumination device; and FIG. 1E is a detailed view of a connecting member of the illumination device. FIG. 2 is a detailed view of an optical guide employed in the illumination device of the embodiment of the present invention.

Reference numeral 1 shown in FIG. 1A designates an optical guide that is made of a translucent material; that receives light radiated from an LED light source 4, which will be described later, and guides the received light through an interior of the optical guide; and that guides the light received from an LED light source 4 while letting the light repeatedly undergo reflection and transmission within the optical guide. When used in a scanner, or the like, each of the optical guides 1 assumes a rod shape in many cases. In addition to a columnar rod-shaped member having a consistent thickness, a conical, rod-shaped member whose cross section (a diameter of a circle) gradually becomes smaller with an increasing distance from one end to a center portion is also conceivable.

In relation to an example configuration of the optical guide 1 provided below, explanations are provided by reference to an example conical, rod-shaped member whose cross section gradually becomes smaller in thickness with an increasing distance from one end to a center portion.

Reference numeral 2 shown in FIG. 1B designates light refraction/reflection surfaces corresponding to reflection portions; namely, a plurality of sawtooth light refraction/reflection surfaces provided on one side face of each of the optical guides 1 along its longitudinal/axial direction. Light passing through the optical guides 1 (or a portion of the light) undergoes reflection on the reflection portions 2, to thus radiate outside of the optical guide 1; namely, a draft, or the like, that is an object to be read. An enlarged view of some of the reflection sections is provided in a circle of broken line shown in FIG. 2.

A plurality of sawtooth faces of the light refraction/reflection surfaces 2 are integrally formed on a bulging bottom of the optical guide 1 and from a transparent resin by means of injection molding.

In consideration of translucency, heat resistance, and fluidity of a resin achieved during injection molding, heat resistant acryl, polycarbonate, amorphous polyolefin, and the like, are suitable for a material of the translucent resin. The optical guides 1 are thus completed.

Reference numeral 10 shown in FIG. 1A designates a guide rib provided on both side surfaces of the respective optical guides 1. Reference numeral 3 designates a circuit board; 4 designates an LED light source; and 5 designates a connecting portion. The connection portions 5 hold the circuit boards 3 on which the LED light sources 4 are respectively mounted and the optical guides 1. Reference numeral 6 designates a light shielding member; 7 designates a reflection member; and 8 designates a connecting member. The connecting member 8 couples the two optical guides 1 to each other. Reference numeral 9 designates a frame.

The illumination device of the first embodiment configured as mentioned above is described in a more specific manner.

In each of the LED light sources 4, light originating from a blue LED element mounted in the light source is reflected by a pigment-based fluorescent agent made around the LED element, to thus illuminate as white light in a pulsing manner in synchronism with operation of a scanner (not shown) that travels back and forth above the draft.

Although the LED light source 4 is disposed on either lateral side of each of the optical guides 1, the LED light sources exhibiting the same luminous efficiency are used in combination in order to hold down a difference between the illuminance distribution achieved on a right side of the document surface and the illuminance distribution achieved on a left side of the document surface, which will be caused by variations in light quantity.

A round hole for holding the optical guide 1 is provided in the connecting portion 5, and an angular hole for positioning the LED light source 4 is also provided on a side of the connection portion 5 that holds the circuit board 3. The center of the round hole and the center of the angular hole are in agreement with each other. The center of illumination of each of the LED light source 4 becomes thereby coincident with an axis of the corresponding optical guide 1, so that the light radiated from the LED light sources 4 are efficiently received by the optical guides 1.

When the optical guides 1 are fitted to the connecting portions 5, light entrances of the optical guides 1 are inserted into the round holes of the respective connecting portions 5. The ring-shaped light shielding member 6 is previously inserted to and held on either side of each of the optical guides 1.

The circuit board 3 on which there is mounted the LED light source 4 is positioned and held with reference to an outer shape of the LED light source 4 by means of the angular hole of the connecting portion 5. The optical guide 1 is also held in such a way that a light entrance end face of each of the optical guides 1 comes close to light-emitting surfaces of the respective LED light sources 4 along the round hole of the connecting portion 5.

The light shielding members 6 shown in FIG. 1B are at this time inserted into corresponding round holes of the respective connecting portions 5 simultaneously with the optical guides 1 being fitted to the connecting portions 5, whereupon clearance between the optical guides 1 and the corresponding connecting portions 5 is closed.

A material of the light shielding member 6 may also be produced in the form of an O-ring formed from; for instance, a sponge made by foaming white polyethylene, polyether, and the like, or rubber such as silicone.

Positioning grooves for positioning the direction of rotation of the frame 9 along with the guide ribs 10 formed on respective side surfaces of the optical guide 1 and guide grooves parallel to the light refraction/reflection surfaces 2 of the optical guides 1 are formed in the frame 9 shown in FIG. 1A by means of extrusion molding of aluminum. The surface of the frame 9 is subjected to treatment by means of anodized aluminum in order to absorb light leaked from the optical guides 1.

Materials used as the reflection member 7 include a plastic film, such as a polyester film, whose surface is cladded with aluminum foil, which serves as a reflection layer, by means of an adhesive in consideration of translucency and a spectral characteristic; and metal, such as aluminum and chrome, which is formed by means of vacuum deposition, sputtering, and the like, and to which a thermoplastic film; for instance, PET, PBT, PEN, PMMA, polycarbonate, and the like, is thermally contact-bonded as a protective layer. Aluminum exhibiting a reflectance of 90% or more is used herein. The reflection member 7 corresponds to an auxiliary reflection portion.

The reflection member 7 is adhesively fastened to both ends of the frame 9 along the guide groove by means of a fastening member; for instance, an adhesive taper, or bonded to or formed integrally on exterior surfaces of the respective optical guides 1.

The light radiated from the LED light sources 4 and entered the optical guides 1 travels while repeatedly undergoing reflection/transmission within the optical guides 1, and a portion of the light is reflected by the light refraction/reflection surfaces 2.

However, not all of the light reached the light refraction/reflection surfaces 2 is reflected, and a portion of the light leaks to the outside of the optical guide 1 as indicated by reference numeral b5. The thus-leaked light slips by the neighborhood of the light refraction/reflection surfaces 2, to thus leak outside the optical guides 1.

The thus-leaked light is again reflected by the reflection member 7 toward the inside of the optical guides 1. The light is separated into light that exits from the inside of the optical guides 1 toward the surface of a draft, light that again repeatedly undergoes refraction or reflection within the optical guides 1 and is radiated to the surface of the draft, and light that is reflected by the reflection member 7. The light repeatedly undergoes these operations.

In the optical guides 1 and the circuit boards 3 held by the connecting portions 5, guide ribs 10 of the optical guides 1 are guided by positioning grooves of the frame 9, and the connecting portions 5 are held by both end faces of the frame 9.

As shown in FIG. 1E, the connecting member 8 is previously held at a leading end of one of the optical guides 1 inserted into the frame 9 from both ends thereof, and the two optical guides 1 are coupled together in a mutually-abutting manner at the center of the frame 9.

Although the structure of the monochrome illumination device has been described thus far, the illumination device can also be embodied as an illumination device for reading a color image in which three colors; namely, R (red), G (green), and B (blue), of LED chips are integrated into a single package in the LED light source 4 and in which the G chip, which is the center element, is aligned with the axis of the optical guide.

Figure 3:
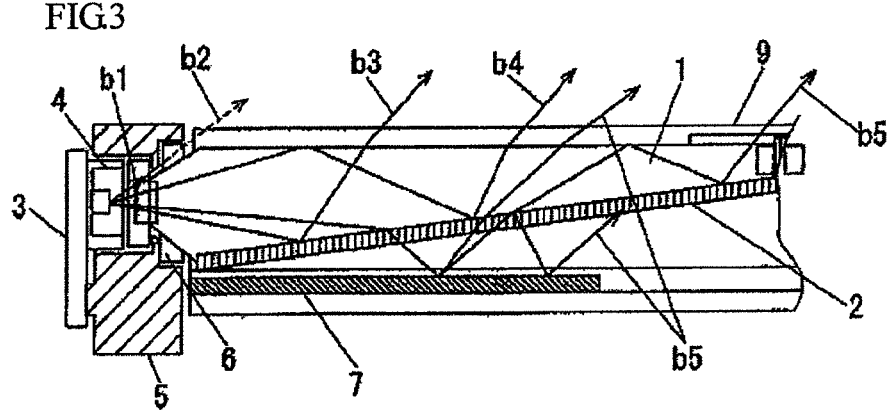
FIG. 3 is a diagram showing an operating principle and characteristics of the illumination device of the embodiment.

An operating principle and characteristics of the thus-built illumination device of the first embodiment of the present invention are now described. FIG. 3 is a diagram showing an operating principle and characteristics of the illumination device of the embodiment of the present invention, in which the side cross-sectional view of the illumination device shown in FIG. 1A is illustrated. Arrow "b" depicts the manner of travel of light.

Of the light radiated from the LED light source 4, a light component b1 exiting at an angle of illumination to a direction of clearance between the optical guide 1 and the corresponding connecting portion 5 will exit directly to the outside from the clearance between the optical guide 1 and the corresponding connecting portion 5 as indicated by a broken arrow b2 unless the light shielding member 6 is provided. As a result, illuminance of the draft surface achieved in the vicinity of the connecting portion 5 will become considerably high and eventually lead to an increase in variations in illuminance.

However, the light shielding member 6 is placed in the clearance between the optical guide 1 and the corresponding connecting portion 5. Hence, light does not exit directly toward the draft after entering the optical guide 1.

Of the other light components, a light component b3 directly reached the light refraction/reflection surfaces 2 undergoes reflection on the light refraction/reflection surfaces 2, to thus be radiated toward the surface of the draft. An entirety of a light component b4 entered the optical guide 1 at a critical angle repeatedly undergoes total reflection on the side surface of the optical guide 1, to thus eventually reach the light refraction/reflection surfaces 2. The light component undergoes refraction or reflection on the light refraction/reflection surfaces, whereby the angle of the light component is sharply bent. Subsequently, the light exits upward from the other side surface opposing the light refraction/reflection surfaces 2, thereby illuminating the surface of the draft.

However, not all of the light reached the light refraction/reflection surfaces 2 undergoes reflection. A portion of the light leaks out of the optical guide 1 as indicated by reference symbol b5. The thus-leaked light is again reflected toward the optical guide 1 by the reflection member 7, to thus again repeatedly undergo refraction or reflection within the optical guide 1 along with the light exiting toward the draft surface from the inside of the optical guide 1. Thus, light is separated into light that illuminates the draft surface and light that undergoes reflection on the reflecting member 7. These operations are iterated.

Specifically, in an area where the reflection member 7 is provided, the reflection member 7 repeatedly lets the majority of the light leaked outside from the light refraction/reflection surfaces 2 exit toward the draft surface. Therefore, the efficiency of the light exited toward the draft surface is improved. The illuminance of the draft is consequently increased.

Figure 4A:
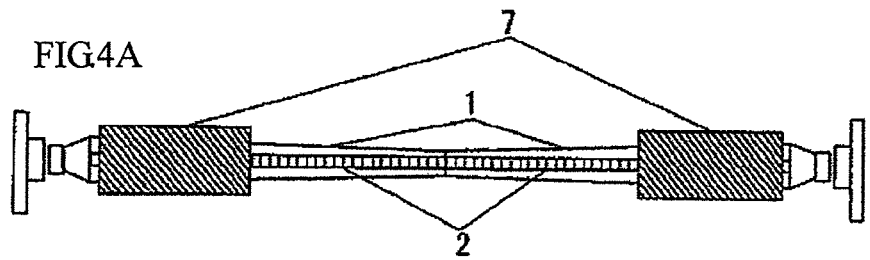
FIGS. 4A to 4C are descriptive views of a reflecting member employed in the illumination device of the embodiment.
Figure 4B:
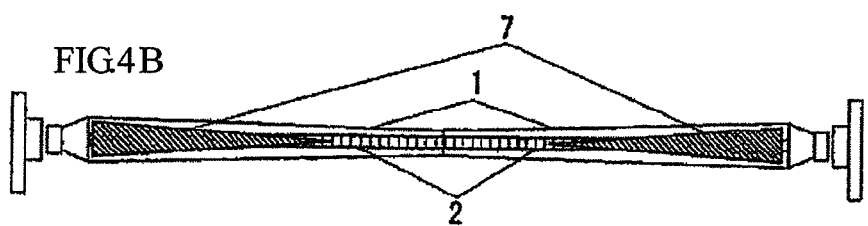
Figure 4C:
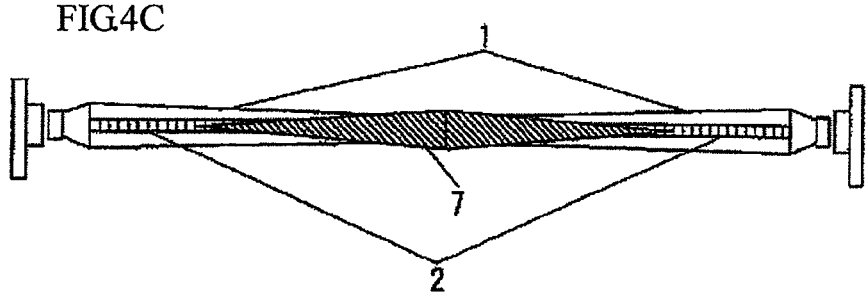

FIGS. 4A to 4C are descriptive views of a reflecting member employed in the illumination device of the embodiment of the present invention. The reflecting members 7 shown in FIG. 4A assume the shape of a rectangular parallelepiped. The reflecting members 7 shown in FIG. 4B assume the shape of a triangle. The reflecting members 7 shown in FIG. 4C assume the shape of a rhomboid.

In the case of the rectangular-parallelepiped shape shown in FIG. 4A, the reflecting members 7 are easy to machine. When the reflecting members 7 are affixed to the groove of the frame 9, affixation can readily be practiced. In the case of the triangular shape shown in FIG. 4B, a cross-sectional area of each of the reflecting members 7 changes in its axial direction; hence, it is possible to gently change the quantity of reflected light. The rhombic shape shown in FIG. 4C yields the same advantage as that yielded by the triangular shape. In addition, an increase in illuminance of the center of the optical guide 1 can be implemented by means of only one reflecting member 7.

Figure 5:
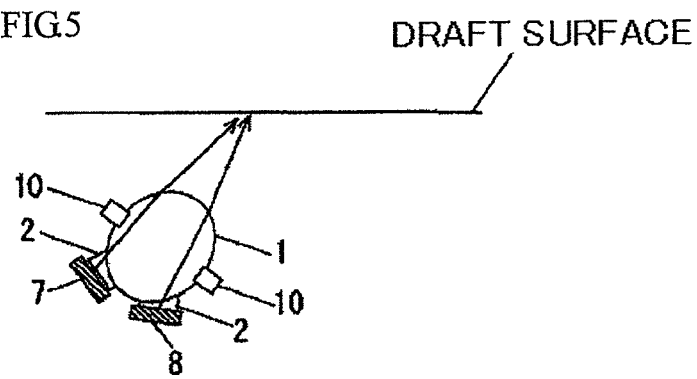
FIG. 5 is a descriptive view of the reflecting member employed in the illumination device of the embodiment.

FIG. 5 is a descriptive view of a reflecting member employed in the illumination device of the embodiment of the present invention. The plurality of reflecting members 7 are provided in correspondence with the plurality of light refraction/reflection surfaces 2. In the embodiment shown in FIG. 5, the light reflection/refraction surfaces 2 of the optical guide 1 are arranged in two parallel rows along a longitudinal direction of the optical guide 1, and the reflecting members 7 are disposed on a lower portion of the optical guide 1 so as to correspond to the respective rows of the light refraction/reflection surfaces 2.

In this case, since the area of the light refraction/reflection surfaces 2 can be increased, so that the illuminance of light exiting from the optical guide 1 toward the draft surface can further be increased. The distribution of illuminance of the draft surface can be increased by adjusting angles of the respective light refraction/reflection surfaces 2. For instance, one reflection member 7 and another reflection member 7 are disposed in an asymmetrical layout with respect to an axis of the cross section of the optical guide 1 as shown in FIG. 5, whereby the light reflected by the one reflection member 7 and the light reflected by the other reflection member 7 travel in respective different directions. The range of radiation on the draft surface can thereby be broadened. Even when a variation has arisen in a distance between the draft surface and the optical guide 1, fluctuations in illuminance appearing on the draft surface can be lessened. Even when the reflection members 7 are arranged at angles with respect to the light refraction/reflection surfaces 2, illuminance achieved on the draft surface can be adjusted.

Figure 6:
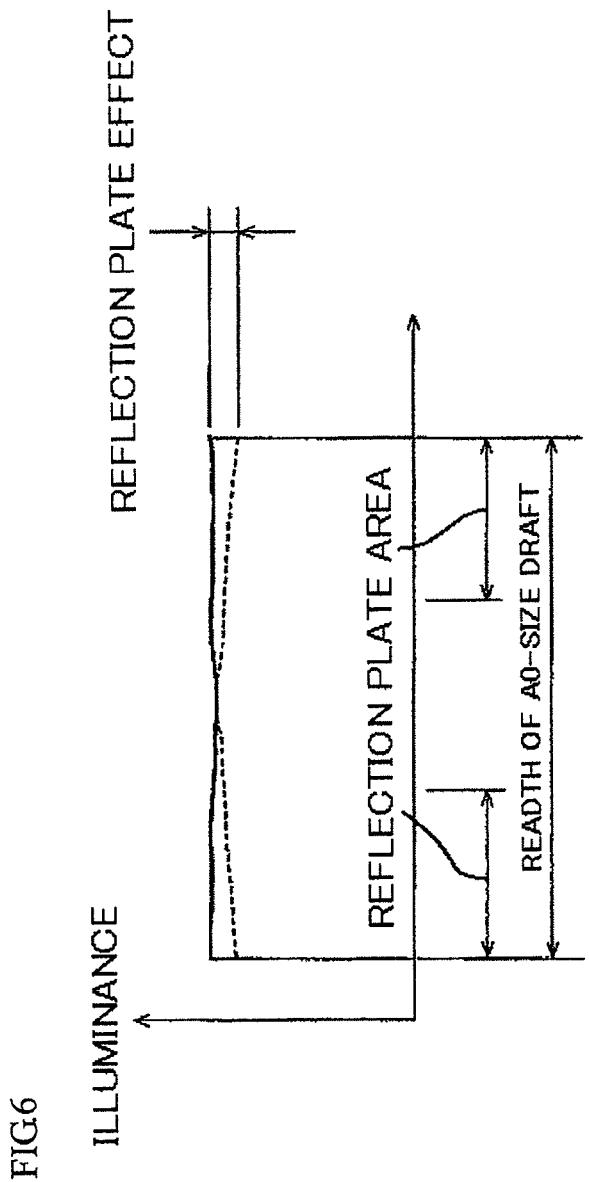
FIG. 6 is a graph showing an illuminance distribution of the illumination device of the embodiment.

An A0-size illumination device was built, and characteristics of the device were evaluated. FIG. 6 is a graph showing an illuminance distribution of the illumination device of the embodiment of the present invention. A distribution of illuminance of the A0-size illumination device is plotted.

A broken line shown in FIG. 6 depicts a characteristic achieved when there is not provided the reflection member 7 and when illuminance achieved at both ends of the illumination device is smaller than that achieved at the center of the illumination device. There is also a case where the illuminance achieved at both ends is larger than that achieved at the center. The reason for this is that a distribution of illuminance is greatly dependent on molding conditions used for molding the optical guide 1. In some occasions, a sag arises in an edge as a result of the light refraction/reflection surfaces 2 not being perfectly transferred to a mold because of a variation in molding conditions. In other occasions, light transmittance is deteriorated as a result of the inside of the optical guide 1 becoming whitened dependent on a molding temperature used during molding operation.

For these reasons, it is first necessary to make the molding conditions stable in order to render the distribution of illuminance stable. Even if the molding conditions are made stable, variations of about 30%; however, still arises in illuminance when the breadth of the optical guide 1 is large. Moreover, when the illuminance of illumination is increased, variations in illuminance tend to become much greater.

However, in the present embodiment, the reflection member 7 is disposed at either end of the illumination device having a low degree of illuminance. Therefore, variations in illuminance of the illumination device fall within a range of about 15% as indicated by a solid line shown in FIG. 6. Specifically, the reflection member 7 increased the quantity of light acquired at both ends of the illumination device by 15%. The shape of the reflection member assumes a rectangular parallelepiped in the present embodiment. If the shape is a triangle, fluctuations in illumination will become milder.

There can consequently be embodied a scanner that enables pursuit of uniform illuminance without deterioration of illuminance on a draft surface and that can prevent occurrence of unevenness in a read image, or the like.

Figure 7:
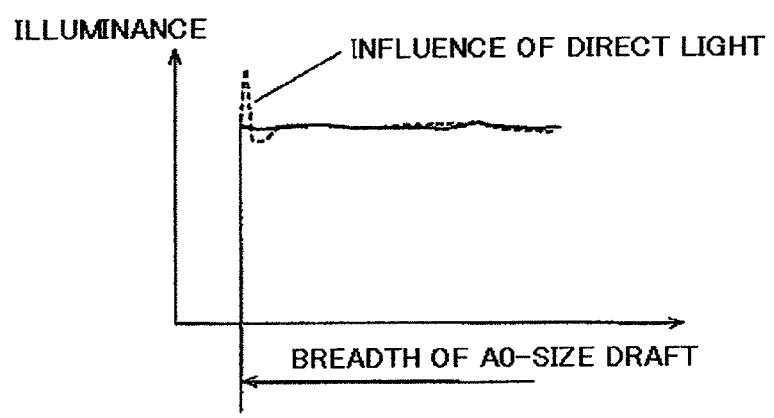
FIG. 7 is a graph showing an effect of a light shielding member employed in the illumination device of the embodiment.

FIG. 7 is a graph showing an effect of a light shielding member employed in the illumination device of the embodiment of the present invention. A broken line in the drawing depicts a distribution of illuminance achieved on a draft when the light shielding members 6 are not provided. As previously described by reference to FIG. 3, or the like, the light component b1 exited at an angle of illumination toward the clearance between the optical guide 1 and the connecting portion 5, among the light radiated from the LED light source 4, illuminates the draft surface as the light b2 passed through the optical guide 1.

In this case, the illuminance achieved at the light entrance of the optical guide 1 becomes excessively large, which in turn increases variations in luminance. On the contrary, a solid line depicts a distribution of illuminance achieved when the light shielding member 6 is placed in the clearance between the optical guide 1 and the connecting portion 5. The light component b1 exited toward the clearance between the optical guide 1 and the connecting portion 5 is blocked. Therefore, the light b2 passed through the optical guide 1 does not arise, and variations in illuminance do not appear on the draft surface at the light entrance.

The LED light source 4 in which three colors, R (red), G (green), and B (blue), of LED chips are packed as a single package is illuminated in sequence of red, green, and blue, whereby a power-source-switchover illumination device for reading a color image can also be realized.

The Second Exemplary Embodiment

Figure 8A:
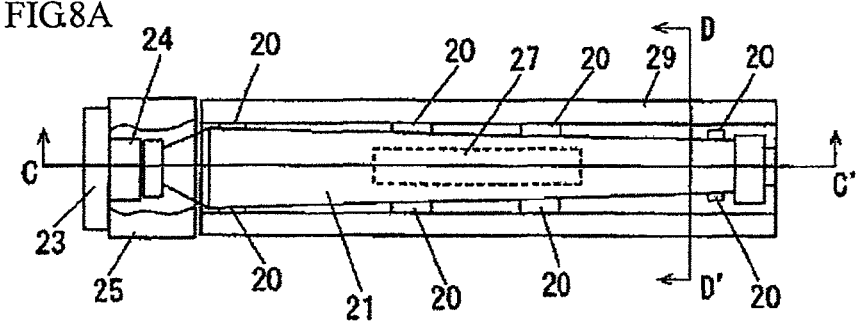
FIGS. 8A to 8C are schematic views of the illumination device of the embodiment.
Figure 8B:
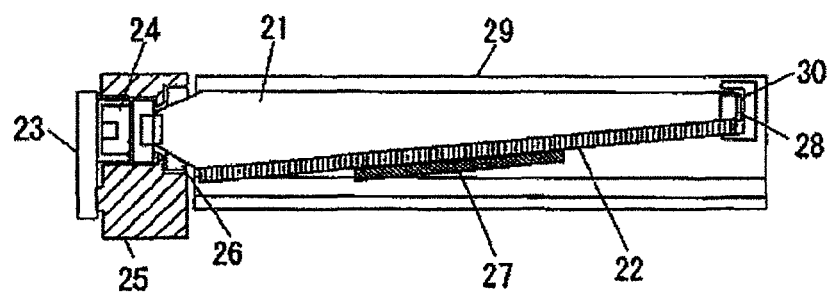
Figure 8C:
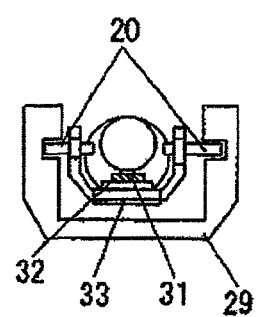

FIGS. 8A to 8C are schematic views of an illumination device of another exemplary embodiment of the present invention, showing a configuration of the illumination device of a second exemplary embodiment. FIG. 8A is a plan view of the illumination device; FIG. 8B is a lateral cross-sectional view of the same taken along line C-C'; and FIG. 8C is a front cross-sectional view of the same taken along line D-D'.

In FIG. 8A, reference numeral 21 designates an optical guide; 22 designates a light refraction/reflection surface that is provided on one longitudinal side surface of the optical guide 21 and that is made up of a plurality of sawtooth faces; 23 designates a circuit board; 24 designates an LED light source; and 25 designates a connecting portion that holds the circuit board 23 on which there is mounted the LED light source 24 and the optical guide 21.

In FIG. 8B, reference numeral 26 designates a light shielding member; 27 designates a reflection member; 29 designates a frame; 28 designates another end; and 30 designates a light reflection layer formed on another end face.

Figure 9A:
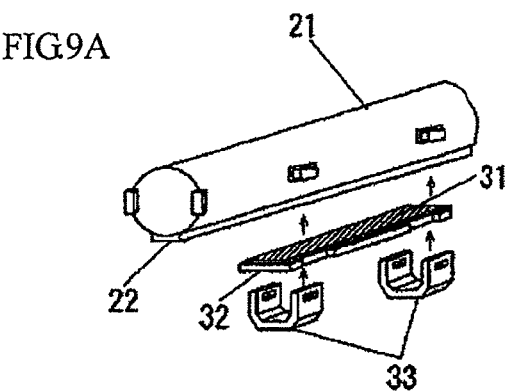
FIGS. 9A and 9B are descriptive views of the reflecting member employed in the illumination device of the embodiment.
Figure 9B:
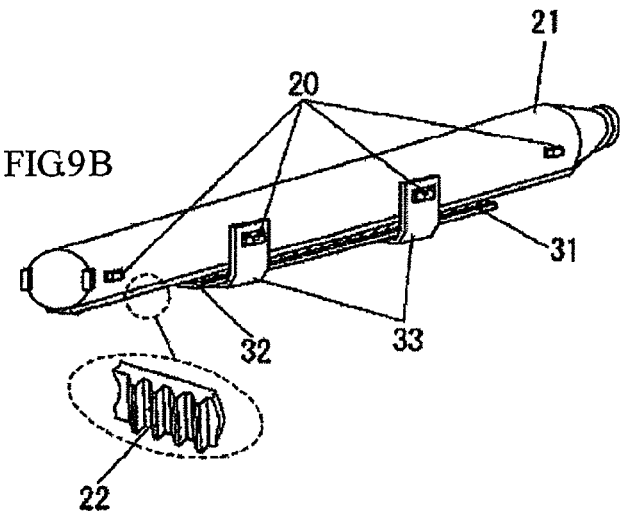

FIGS. 9A and 9B are descriptive views of the reflecting member employed in the illumination device of the embodiment of the present invention. FIG. 9A is a view of attachment of the reflection member 27, and FIG. 9B is a schematic illustration showing that the optical guide 21 holds the reflection member 27. Reference numeral 31 designates a reflection surface; 32 designates a base member; 33 designates a support member; and 20 designates guide ribs provided on both sides of the optical guide 21.

The optical guide 21 is built in such a way that a cross-sectional area (a diameter of a circle) of the optical guide becomes smaller from left to right as shown in FIGS. 8A to 8C.

The illumination device configured as mentioned above of the second embodiment is described in a more specific manner. First, light originating from a blue LED element mounted in the LED light source 24 is reflected by a pigment-based fluorescent agent made around the LED element, to thus illuminate as white light in a pulsing manner in synchronism with operation of a scanner (not shown) that travels back and forth above the draft. Although there is adopted a system in which the scanner travels from right to left, there may also be adopted a system in which a draft is moved over a stationary scanner.

A round hole for holding the optical guide 21 is provided in the connecting portion 25, and an angular hole for positioning the LED light source 24 is also provided on a side of the connection portion 25 that holds the circuit board 23. The center of the round hole and the center of the angular hole are in agreement with each other. The center of illumination of each of the LED light source 24 becomes thereby coincident with an axis of the optical guide 21, so that the light radiated from the LED light sources 24 are efficiently received by the optical guide 21.

As shown in FIG. 8B, the ring-shaped light shielding member 26 is previously inserted to and held on a light entrance of the optical guide 21. When the optical guide 21 is attached to the connecting portion 25, the light shielding member is inserted into the round hole of the connecting portion 25. The circuit board 23 on which there is mounted the LED light source 24 is positioned and held with reference to an outer shape of the LED light source 24 by means of the angular hole of the connecting portion 25. The optical guide 21 is also held in such a way that a light entrance end face of the optical guide 21 comes close to a light-emitting surface of the LED light source 24 along the round hole of the connecting portion 25. The light shielding member 26 is at this time inserted into the round hole of the connecting portion 25 simultaneously with the optical guide 21 being fitted to the connecting portion 25, whereupon clearance between the optical guide 21 and the connecting portion 25 is closed.

A material of the light shielding member 26 may also be produced in the form of an O-ring formed from; for instance, a sponge made by foaming white polyethylene, polyether, and the like, or rubber such as silicone.

Positioning grooves for positioning the direction of rotation of the frame 29 along with the guide ribs 20 formed on respective side surfaces of the optical guide 21 and guide grooves parallel to the light refraction/reflection surface 22 of the optical guide 21 are formed in the frame 29 by means of extrusion molding of aluminum. The surface of the frame 29 is subjected to treatment by means of anodized aluminum in order to absorb light leaked from the optical guide 21.

Materials used as the reflection surface 31 shown in FIGS. 9A and 9B include a plastic film, such as a polyester film, whose surface is cladded with aluminum foil to serve as a reflection layer by means of an adhesive in consideration of translucency and a spectral characteristic; and metal, such as aluminum and chrome, which is formed as a protective layer by means of vacuum deposition, sputtering, and the like, and to which a thermoplastic film; for instance, PET, PBT, PEN, PMMA, polycarbonate, and the like, is thermally contact-bonded. Aluminum exhibiting a reflectance of 90% or more is used herein.

The reflection surface 31 is adhesively fastened to a black thin-plate-like base member 32 formed from a thermoplastic resin, such as ABS and PS, by means of a fastening member; for instance, an adhesive tape, or the like, thereby making up the reflection member 27. Notches are further made in the base member 32 in agreement with pitches of the guide ribs 20 provided on both side surfaces of the optical guide 21.

The thus-formed reflection member 27 is pushed from below such that the angular hole of the reflection member securing member 33 is inserted into the guide ribs 20 while the reflection surface 31 remains in contact with the light refraction/reflection surface 22 of the optical guide 21 and while the guide ribs 20 provided on both side surfaces of the optical guide 21 and the notches formed in the base member 32 are positionally aligned to each other. The reflection member 27 is thereby engaged with the optical guide 21. The reflection member securing member 33 and the base member 32 are herein separated from each other but may also be formed integrally.

The guide ribs 20 of the optical guide 21 are guided by the positioning grooves of the frame 29 while the connecting portion 25 holds the optical guide 21 holding the reflection member 27 and the circuit board 24, and the connecting portion 25 is held by an end face of the frame 29.

The optical guide 21 and the light refraction/reflection surface 22 with a plurality of sawtooth faces provided on the optical guide are formed integrally from a transparent resin by means of injection molding. The plurality of sawtooth faces of the light refraction/reflection surface 22 are formed on a bulging bottom surface of the optical guide 21.

In consideration of translucency, heat resistance, and fluidity of a resin achieved during injection molding, heat resistant acryl, polycarbonate, amorphous polyolefin, and the like, are suitable for a material of the transparent resin.

A light reflection layer 30 is also formed on the other end 28 of the optical guide 21 by means of evaporation or dipping of aluminum. The light reflection layer can also be made by affixing an aluminum tape to the other end, wherein the aluminum tape is made by bonding aluminum foil by means of a transparent adhesive. Alternatively, the light reflection layer can also be made by inserting a cap made of a white resin into the other end.

Although the structure of the monochrome illumination device has been described herein, the illumination device can also be embodied as an illumination device for reading a color image in which three colors; namely, R (red), G (green), and B (blue), of LED chips are integrated into a single package in the LED light source 24 and in which the G chip is aligned with the axis of the optical guide.

An operating principle and characteristics of the thus-built illumination device of the second embodiment of the present invention are now described by reference to FIG. 10. FIG. 10 is a diagram showing an operating principle and characteristics of the illumination device of the embodiment of the present invention; namely, an enlarged illustration of the side cross-sectional view of the illumination device shown in FIG. 8B. Arrow "c" depicts the manner of travel of light.

Of the light radiated from the LED light source 24, a light component $c1$ exiting at an angle of illumination to a direction of clearance between the optical guide 21 and the connecting portion 25 will exit directly to the outside from the clearance between the optical guide 21 and the connecting portion 25 as indicated by a broken arrow $c2$ unless the light shielding member 26 is provided. As a result, illuminance of the draft surface achieved in the vicinity of the connecting portion 25 will become considerably high and eventually lead to an increase in variations in illuminance.

However, the light shielding member 26 is placed in the clearance between the optical guide 21 and the connecting portion 25. Hence, light does not exit directly toward the draft after entering the optical guide 21.

Of the other light components, a light component $c3$ directly reached the light refraction/reflection surface 22 undergoes reflection on the light refraction/reflection surface 22, to thus be radiated toward the surface of the draft. An entirety of a light component $c4$ entered the optical guide 21 at a critical angle repeatedly undergoes total reflection on the side surface of the optical guide 21, to thus eventually reach the light refraction/reflection surface 22. The light component undergoes refraction or reflection on the light refraction/reflection surfaces, whereby the angle of the light component is sharply bent. Subsequently, the light exits upward from the other side surface opposing the light refraction/reflection surface 22, thereby illuminating the surface of the draft.

However, not all of the light reached the light refraction/reflection surface 22 undergoes reflection toward the interior of the optical guide 21. A portion of the light leaks out of the optical guide 21 as indicated by reference symbol $c5$. The thus-leaked light is again reflected toward the optical guide 21 by the reflection member 27, to thus again undergo refraction or reflection within the optical guide 21 along with the light exiting toward the draft surface from the inside of the optical guide 21. Thus, light is separated into light that illuminates the draft surface and light that travels toward the reflecting member 27, and also repeatedly undergoes reflection within the optical guide 21.

Specifically, in the area where the reflection member 27 is provided, the majority of the light leaked out of the optical guide 21 from the light refraction/reflection surface 22 is reflected by the reflection member 27, to thus exit toward the draft surface. Therefore, the efficiency of the light exited toward the draft surface is improved. The illuminance of the draft is consequently increased.

Moreover, the reflection member 27 is disposed in close proximity to the light refraction/reflection surface 22 of the optical guide 21; hence, the majority of the light leaked outside is efficiently reflected and recycled.

The advantage is made effective, so long as the reflection member 27 is provided with the triangular shape and the rhombic shape described in connection with the first embodiment.

Of the light components entered the optical guide 21, the light component reached the other end 28 after having repeatedly undergone total reflection returns to the optical guide 21 as a light component C6 that has again undergone total reflection on the light reflection layer 30. Thus, the light component is recycled and utilized for illuminating the draft surface without few losses.

Figure 11:
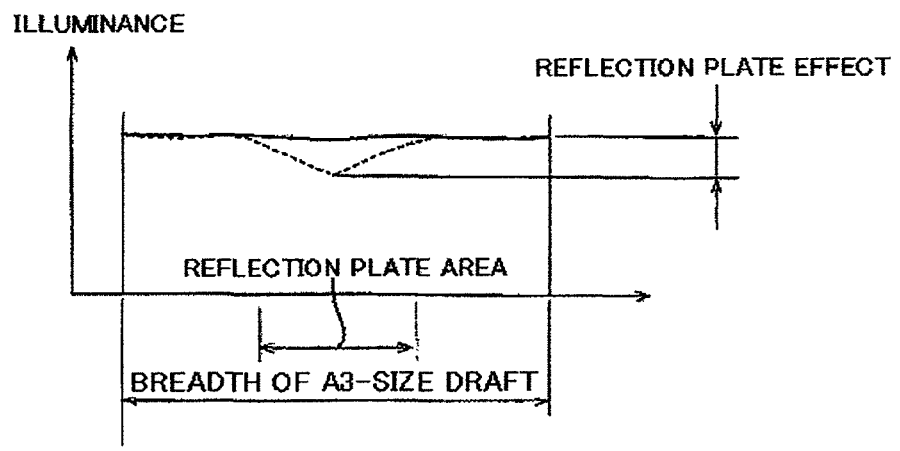
FIG. 11 is a graph showing an illuminance distribution of the illumination device of the embodiment.

An A3-size illumination device was built on the basis of such an operating principle, and characteristics of the device were evaluated. FIG. 11 is a graph showing an illuminance distribution of the illumination device of the embodiment of the present invention. A distribution of illuminance of the A3-size illumination device is plotted. A broken line depicts a characteristic achieved when there is not provided the reflection member 27 and when illuminance achieved at both ends of the illumination device is higher than that achieved at the center of the illumination device. There is also a case where the illuminance achieved at both ends is smaller than that achieved at the center.

The reason for this is that a distribution of illuminance is greatly dependent on molding conditions used for molding the optical guide 21. In some occasions, a sag arises in an edge as a result of the light refraction/reflection surface 22 not being perfectly transferred to a mold because of a variation in molding conditions. In other occasions, light transmittance is deteriorated as a result of the inside of the optical guide 21 becoming whitened dependent on a molding temperature used during molding operation.

For these reasons, it is first necessary to make the molding conditions stable in order to render the distribution of illuminance stable. Even if the molding conditions are made stable, variations of about 30%; however, still arises in illuminance when the breadth of the optical guide 21 is large. Moreover, when the illuminance of illumination is increased, variations in illuminance tend to become much greater.

For these reasons, the reflection member 27 is disposed at the center of the illumination device having a low degree of illuminance, to thus increase illuminance of the center, so that variations in illuminance of the illumination device fall within a range of about 10% as indicated by a solid line shown in FIG. 10.

Specifically, by virtue of the reflection member 27, the quantity of light acquired at the center of the illumination device is increased by 20%. The shape of the reflection member assumes a rectangular parallelepiped in the present embodiment. If the shape is a rhomboid, a superior effect for diminishing variations in illuminance will be yielded.

There can consequently be embodied a scanner that enables pursuit of uniform illuminance without deterioration of illuminance on a draft surface and that can prevent occurrence of unevenness in a read image, or the like.

Figure 12:
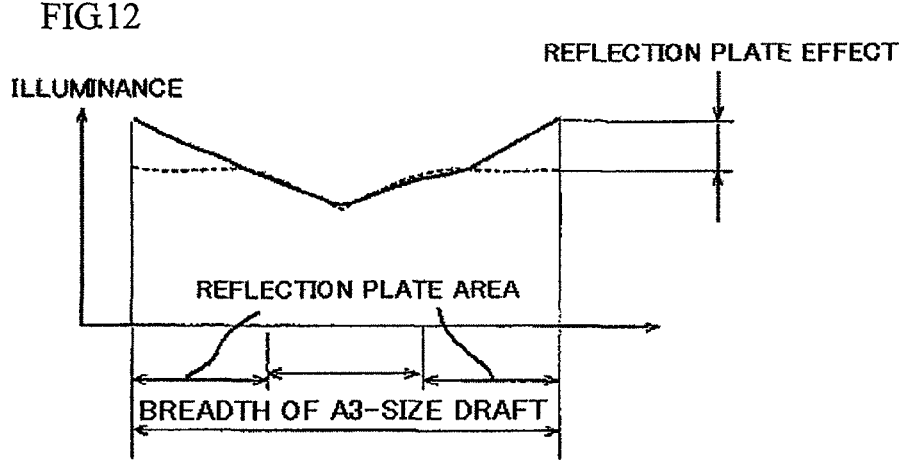
FIG. 12 is a graph of illuminance distribution achieved when a lens of a reduction optical system, which is to be used in the illumination device of the embodiment, is employed.

FIG. 12 is a graph of illuminance distribution achieved when a lens of a reduction optical system, which is to be used in the illumination device of the embodiment of the present invention, is employed.

In the embodiment, the reflection member 27 is disposed at a position where to hold down variations in illuminance distribution on the assumption that a photoelectric conversion element is exposed to light after light reflected on the draft surface has passed through a lens that generates an upright image of equal size. When a lens of a reduction optical system is used, illuminance achieved at both ends of the optical guide must be made larger than that achieved at the center of the optical guide for reasons of a lens characteristic (a cosine fourth-power law) of the reduction optical system.

For this reason, illuminance achieved at both ends of the optical guide 21 must be increased. In this case, a desired distribution of illuminance, such as that indicated by a solid line shown in FIG. 12, can be realized, so long as the reflection member 27 is disposed at either end of the optical guide 21.

The LED light source 24 in which three colors, R (red), G (green), and B (blue), of LED chips are packed as a single package is illuminated in sequence of red, green, and blue, whereby a power-source-switchover illumination device for reading a color image can also be realized.

The Third Exemplary Embodiment

Figure 13:
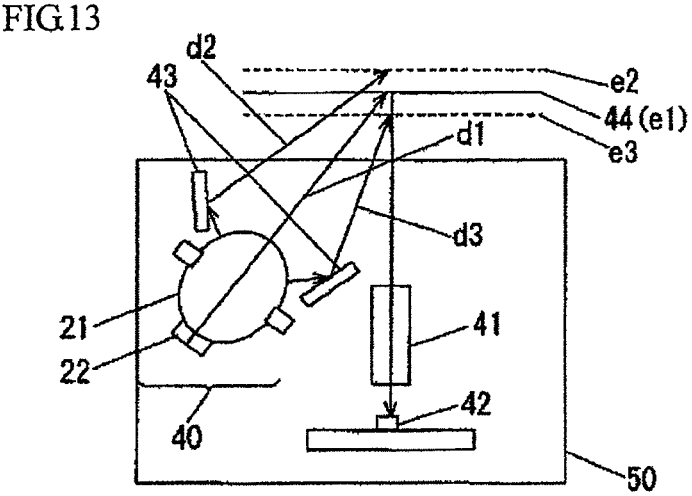
FIG. 13 is a descriptive view of a scanner using the illumination device of the embodiment.

FIG. 13 is a descriptive view of a scanner using the illumination device of the embodiment of the present invention. A draft illumination section corresponds to the illumination device 40 described in connection with the second embodiment. Reference numeral 41 designates a fiber lens array serving as imaging means; and 42 designates a photoelectric conversion element for converting light into an electrical signal. The illumination device is, thus, primarily made up of the fiber lens array and the photoelectric conversion element.

Reference numeral 43 designates a reflection mirror disposed at either end of the illumination device, and the reflection mirrors correspond to the supplemental reflective members as in the case of the first exemplary embodiment. The reflection mirror 32 can also be provided in numbers for the optical guide 21 as shown in FIG. 13. The reflection mirrors 43 can also be provided outside the optical guide 21 while respectively separated away from the optical guide 21. As shown in FIG. 13, the respective reflection mirrors 43 can be positioned in an asymmetrical layout with respect to an axis of the cross section of the optical guide 21.

The fiber lens array 41 lets reflected light generated as a result of a draft 44 being illuminated by the illumination device 40 produce, in the form of light exhibiting an equi-size upright intensity distribution, an image on the photoelectric conversion element 42 serving as an image sensor. The photoelectric conversion element 42 produces an electrical output commensurate with the quantity of incident light.

An operating principle and characteristics of the thus-built scanner of the third embodiment are now described.

The LED light source 24 of the illumination device 40 illuminates the draft 44 in a pulsing manner in synchronism with operation of a scanner 50 that travels back and forth above the draft. The light radiated from the illumination device 40 according to inconsistencies in density of an image on the draft 44 is reflected from the draft surface as intensity distribution information. The reflected light enters the fiber lens array 41, and an image is produced by the photoelectric conversion element 42, whereupon image information is read.

Incidentally, illuminance achieved on the surface of the draft 44 greatly varies according to a distance between the illumination device and the surface of the draft 44. For instance, when the distance between the draft surface and the illumination device 40 is changed by wrinkles in the draft 44 or a lift in the draft 44, the distribution of illuminance of the draft 44 greatly changes in accordance with the distance.

Since the intensity of radiation is usually set so as to become maximum when no lift exists in the draft 44, presence of a lift in the draft 44 induces variations in the distance between the illumination device 40 and the draft 44, which in turn causes considerable variations in illuminance.

However, in the third embodiment, the reflection mirrors 43 are adhesively fixed to the frame 29 shown in FIG. 10 over a portion or entire breadth of the optical guide 21 by means of a double-faced tape, or the like. Light exiting from the optical guide 21 is thereby separated into light that forms an image on a draft surface e1; light d2 that undergoes reflection on one side of the reflection mirror 43, to thus form an image at e2; and light d3 that undergoes reflection on the other side of the reflection mirror 43, to thus form an image at e3.

Materials used for the reflection mirrors 43 include a plastic film, such as a polyester film, whose surface is cladded with aluminum foil as a reflection layer by means of an adhesive in consideration of translucency and a spectral characteristic; and metal, such as aluminum and chrome, which is formed by means of vacuum deposition, sputtering, and the like, and to which a thermoplastic film; for instance, PET, PBT, PEN, PMMA, polycarbonate, and the like, is thermally contact-bonded as a protective layer. Aluminum exhibiting a reflectance of 90% or more is used herein.

Even when a change in distance between the draft 44 and the illumination device 40 attributable to a lift in the draft 44 or an attachment error in the scanner 50 has arisen, the surface of the draft 44 can be illuminated with substantially the same illuminance as that achieved for reference, by means of the light reflected toward the draft 44 by means of the reflection mirrors 43.

Specifically, it is possible to diminish unevenness in a read image attributable to variations in the position of the draft 44 and read an image with high quality.

Results yielded when the scanner 50 read the actual draft 44 are now mentioned. A reference distance between the illumination device 40 and the draft 44 was taken as 10 mm. When the draft 44 approached the illumination device 40 by 2 mm when compared with the reference distance, variations in light quantity was −15%. Conversely, when the draft 44 was separated from the illumination device by 2 mm when compared with the reference distance, variations in light quantity were −20%. In the case of the configuration described in connection with the third embodiment, variations in light quantity achieved when the draft 44 approached the illumination device 40 by 2 mm when compared with the reference distance were improved to −5%. Conversely, when the draft 44 was separated from the illumination device by 2 mm when compared with the reference distance, variations in light quantity were improved to −10%.

Even when wrinkles have arisen in the draft 44, variations in illuminance achieved on an actual image of a draft surface can be held down, so that reading accuracy of an image is enhanced.

INDUSTRIAL APPLICABILITY

The exemplary embodiments of the present invention make it possible to realize an illumination device that exhibits high illumination efficiency on a draft surface and entails few variations in illuminance. The exemplary embodiments of the present invention also provide a highly reliable scanner whose illuminance is not affected by a distance to a draft surface.

In addition to being utilized for a scanner for reading information on a draft or another print medium and business machinery equipped with a scanner, the illumination device of the present invention can be utilized as a scanner incorporated in an electronic white board, or the like, that reads image information, or the like, on a sheet.

The invention claimed is:

1. An illumination device comprising:
   an optical guide for receiving light emitted from a light source and guiding the light by repetitive transmission and reflection;
   a reflective member for reflecting light transmitting in the optical guide to an outside of the optical guide within the optical guide; and
   a supplemental reflective member for reflecting light leaked from the optical guide to an inside of the optical guide, the supplemental reflective member extending along a portion of the reflective member in a longitudinal axis direction of the optical guide.

2. The illumination device according to claim 1, wherein a plurality of the supplemental reflective members are provided for the optical guide.

3. The illumination device according to claim 1, wherein a plurality of the supplemental reflective members are provided for the optical guide, and one of the supplemental reflective members and another one of the supplemental reflective members are asymmetric with respect to a cross sectional axis of the optical guide.

4. The illumination device according to claim 1, wherein a plurality of the supplemental reflective members are provided at an outside of the optical guide and provided separately from the optical guide.

5. The illumination device according to claim 1, wherein a plurality of the supplemental reflective members are provided at an outside of the optical guide and provided separately from the optical guide, and one of the supplemental reflective members and another one of the supplemental reflective members are asymmetric with respect to a cross sectional axis of the optical guide.

6. A scanner and an office machine comprising the illumination device according to claim 1.

7. An electrical black board comprising the illumination device according to claim 1.

8. The illumination device according to claim 1, wherein the reflective member is a sawtooth surface provided on a surface of the optical guide.

9. The illumination device according to claim 8, wherein the supplemental reflective member is symmetrically provided at a member of the optical guide in a longitudinal direction along which the optical guide extends.

10. The illumination device according to claim 8, wherein the supplemental reflective member is in contact with the reflective member from out side of the optical guide.

11. The illumination device according to claim 8, wherein the supplemental reflective member is provided at an outside of the optical guide and provided separately from the optical guide.

12. The illumination device according to claim 1, wherein the portion of the reflective member along which the supplemental reflective member extends has a degree luminance of the optical guide that is lower than a degree of luminance of the optical guide at a remaining portion of the reflective member.

13. The illumination device according to claim 1, wherein the portion of the reflective member along which the supplemental reflective member extends is provided at either end of the optical guide.

14. The illumination device according to claim 1, wherein the supplemental reflective member extends along only the portion of the reflective member in the longitudinal axis direction of the optical guide.

* * * * *